Nov. 29, 1932.  S. DINSMORE  1,889,016
AGRICULTURAL IMPLEMENT
Filed April 8, 1930  2 Sheets-Sheet 1
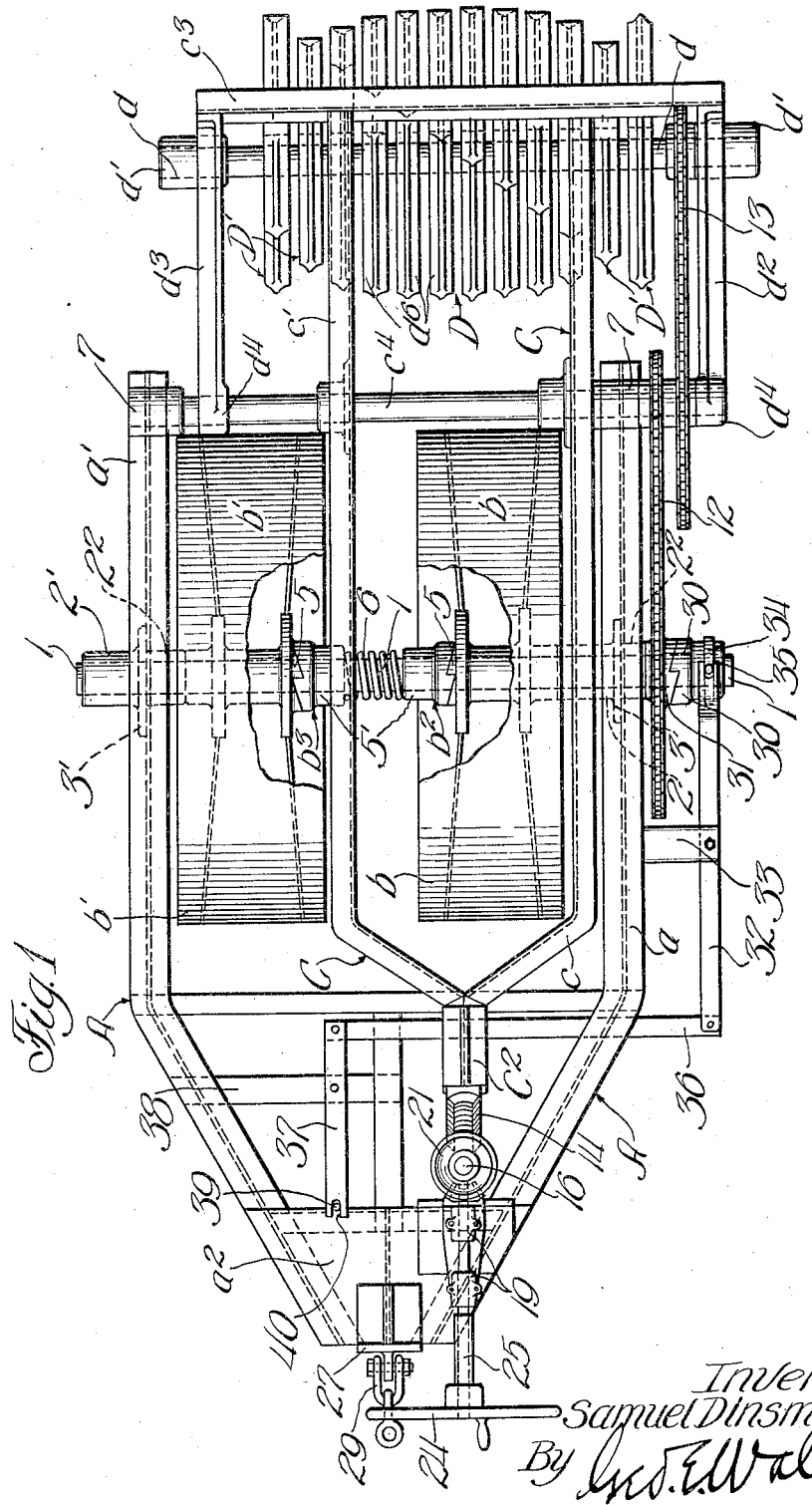
Inventor:
Samuel Dinsmore
By Geo. E. Waldo
Atty.

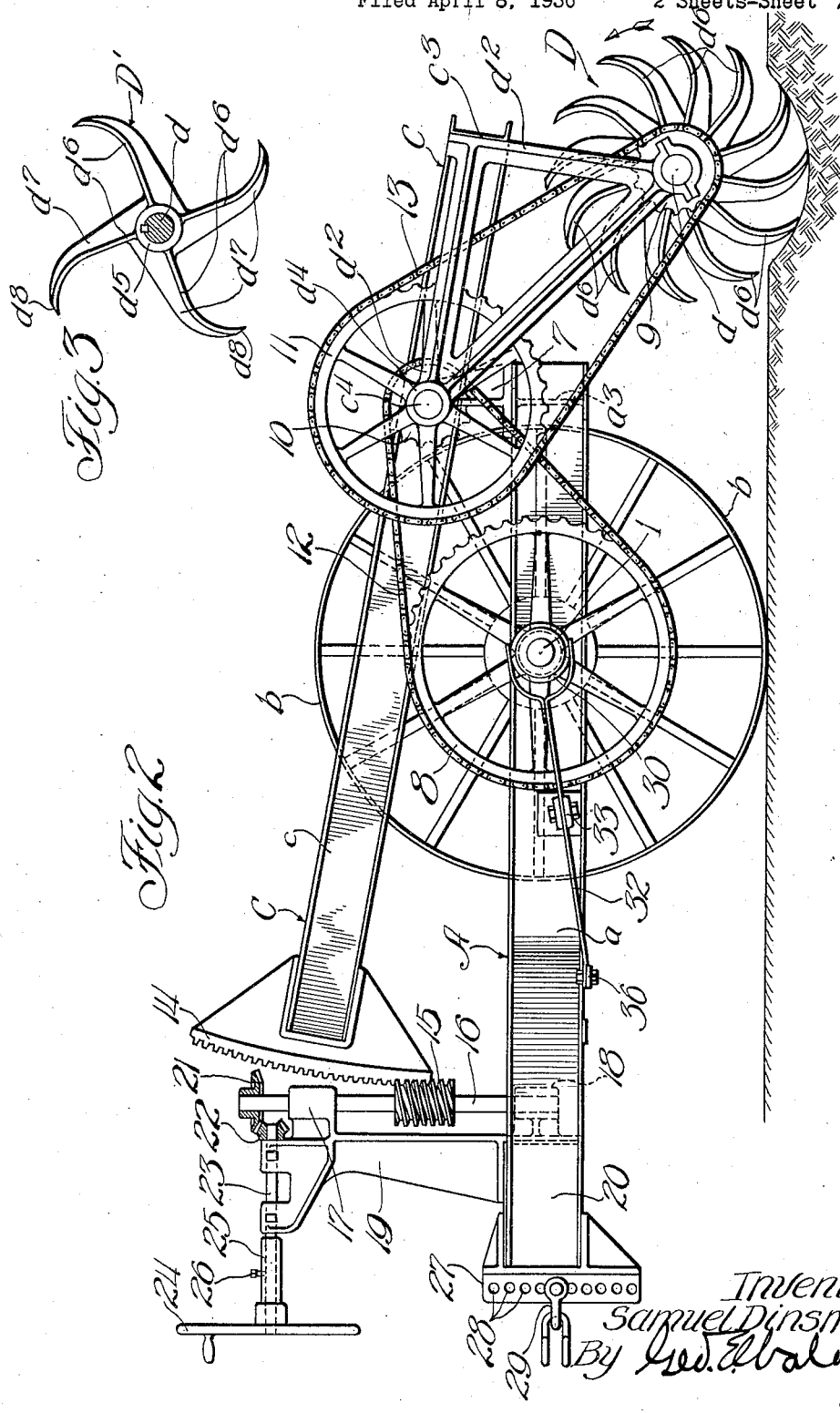

Patented Nov. 29, 1932

1,889,016

UNITED STATES PATENT OFFICE

SAMUEL DINSMORE, OF CHICAGO, ILLINOIS

AGRICULTURAL IMPLEMENT

Application filed April 8, 1930. Serial No. 442,546.

This invention relates to agricultural implements designed and adapted for preparing soil for seeding, and relates particularly to what may be designated as rotary soil-tilling machines, comprising a relatively wide tilling implement proper, designed and adapted for preparing the soil for seeding at a single operation.

The object of the invention is to provide an implement for the purpose specified, which will have relatively large capacity; which will be relatively flexible, that is, may be turned on a relatively short radius; which will be simple in construction, strong and durable; effective for its designed purpose; and relatively inexpensive to manufacture.

A further object of the invention is to provide a soil-tilling implement of the type specified, which is particularly designed and adapted to be tractor drawn, but is otherwise self-contained and complete in itself.

To effect the objects thereof, a soil-tilling implement embodying my invention and improvements comprises the various features, combinations of features and details of construction hereinafter described and claimed.

In the accompanying drawings, in which the invention is fully illustrated,

Fig. 1 is a top plan view of a soil-tilling implement embodying my invention and improvements.

Fig. 2 is a side view thereof, taken from the lower side of Fig. 1; and

Fig. 3 is a detached sectional view of the soil-tilling implement proper.

Describing the invention with particular reference to the drawings, my improved soil-tilling implement comprises a main frame, designated as a whole, A, consisting, as shown, of I-beams $a$, $a'$, the front ends of which converge symmetrically towards each other, as clearly shown in Fig. 1, and are rigidly connected by means of upper and lower plates $a^2$. The rear ends of said side frame members are rigidly connected by means of a transverse I-beam $a^3$.

In operation, the main frame A is supported by a single axle 1 rotatably mounted in bearings formed in hubs or bosses 2, 2', secured to the webs of the I-beams $a$, $a'$ of the main frame A. As shown, said bearing hubs or bosses comprise flanges 3, 3' riveted or otherwise secured to the webs of the frame members $a$, $a'$. As shown, also, said bearing hubs or bosses 2, 2' comprise sections $2^2$ which project through holes formed in the webs of the I-beams $a$, $a'$.

The frame A of the machine is supported and rendered mobile by means of wheels $b$, $b'$ mounted on the axle 1, said machine comprising means rendered operative by advancing movement of the vehicle, for causing said supporting wheels to engage and thereby impart rotation to the axle 1, while, at the same time, permitting rotation of said supporting wheels corresponding to rearward movement of the vehicle, on said axle.

As shown, the means for connecting the wheels $b$, $b'$ to the axle 1 consists of jaw clutches designated as a whole, respectively, $b^2$, $b^3$, each comprising a clutch member 5 formed on hubs of the supporting wheels $b$, $b'$, and clutch members 5' splined to the axle 1 so as to be movable endwise thereon to effect engagement and disengagement of said clutches, respectively.

As shown, said clutches $b^2$, $b^3$, are positioned between the wheels $b$, $b'$ and interposed between the adjacent ends thereof and surrounding the axle 1 as a guide, is an open coiled spring 6 which will operate, in an obvious manner, to urge the movably supported clutch members 5' endwise on the axle 1 to effect engagement of the clutch teeth therein, respectively, with the clutch teeth on the clutch members 5 secured to the hubs of the supporting wheels $b$, $b'$. As shown, also, one side of each of the clutch teeth is inclined, the relation being such that turning movement of the wheels $b$, $b'$ corresponding to rearward movement of the machine, as in turning corners, will cause the teeth of the clutch members 5 to over-run the teeth of the clutch members 5', which will operate, in an obvious manner, to force said clutch members 5' away from the clutch members 5 and towards each other, against the force of the spring 6, thus permitting rearward turning movement of the supporting wheels in the manner desired, said spring 6 operating to again effect engagement of the clutch teeth when advancing movement of the machine is resumed.

Pivotally mounted between its ends on the main frame A is an auxiliary frame C, said auxiliary frame consisting of side frame members $c$, $c'$, the front ends of which are bent inwardly and rigidly connected to each other, as shown in Fig. 1, and secured to the rear ends of which is a transverse member $c^3$ which, for reasons presently explained, projects outwardly somewhat beyond the side frame members $c$, $c'$ of said auxiliary frame.

As shown, said auxiliary frame C is pivoted upon a shaft $c^4$ mounted in bearings formed in the upper ends of bearing blocks or pedestals 7 secured to the rear ends of the side frame members $a$, $a'$ of the main frame A.

The soil-tilling implement proper of my improved machine, designated as a whole, D, presently described more in detail, comprises a shaft $d$ rotatably mounted in bearings formed in bosses $d'$, at the lower ends of brackets $d^2$, $d^3$, secured to and which depend from the frame member $c^3$ secured to the rear ends of the side frame members $c$, $c'$ of the auxiliary frame C, said brackets being also provided at their front ends with bearings formed in bosses $d^4$ which engage the pivot shaft $c^4$ of said auxiliary frame C.

As shown, rotation is adapted to be imparted to the soil-tilling implement D from the axle 1 by suitable driving connection therewith, consisting, as shown, of sprocket wheels 8 and 9 secured to the main axle 1 of the machine and the shaft $d$ of the soil-tilling implement proper D, respectively, and sprocket wheels 10 and 11, which align respectively, and sprocket wheels 10 and 11, which align respectively with the sprocket wheels 8 and 9 and which are formed on a common hub or otherwise rigidly connected so as to rotate together, said driving connection also comprising chain belts 12 and 13 adjusted to the sprocket wheels 8 and 10 and 9 and 11, respectively. The size of said sprocket wheels is proportioned to impart rotation at any desired speed to the soil-tilling implement D. In practice, a desirable relation is such that each revolution of the traction wheels $b$, $b'$, will impart approximately six revolutions to said soil-tilling implement D, the relation being such, also, that said traction wheels will describe a complete revolution for approximately each fifteen feet travelled by the machine in operation. Obviously, however, this relation permits of variation within wide limits depending upon the character of the soil in which the machine is designed to operate.

As shown, the soil-tilling implement proper D consists of a plurality of separate sections D', one of which is shown in Fig. 3 of the drawings, and which comprises a hub $d^5$, formed on which are a plurality, as shown four, arms $d^6$, said arms being spaced uniform distances apart and their outer ends being curved forwardly in the direction of rotation of said soil-tilling implement, in operation. The arms $d^6$ are reinforced and strengthened by the webs $d^7$ formed thereon, the inner ends of said webs being joined to the arms next in the rear thereof, respectively.

The outer ends of the arms $d^6$ are shaped to form cultivator teeth, as shown at $d^8$, and may be varied to conform to the individual ideas of different designers, or as may be considered preferable for different kinds of duty. Or, if desired, my invention contemplates the use of separate teeth made of hard sheet metal, as crane-steel-riveted or otherwise rigidly secured to the arms $d^6$.

The hubs $d^5$ of the section D' are provided with axial bores fitted to the shaft $d$ of said soil-tilling implement proper D, said section D' being preferably keyed to the shaft $d$. To distribute the work performed by the teeth $d^8$, and to correspondingly reduce the strain on the parts of the implement D, and to render said implement more effective in operation, the sections D' are arranged in sets, the keyways in the different sections of each set being so arranged that the arms $d^6$ thereof will be symmetrically staggered, and such, also, that arms of corresponding sections of different sets will align with each other.

My improved machine also comprises means for imparting pivotal movement to the auxiliary frame C to raise and lower the soil-tilling implement D, said means consisting, as shown, of a segmental worm gear 14 secured to the front end of the auxiliary frame C, which intermeshes with a worm gear 15 secured to an upright worm shaft 16 rotatably mounted in bearings formed in brackets 17 and 18, the upper bracket 17 being formed on a pedestal 19 and the bracket 18 being secured to a transverse frame member 20 secured between the front ends of the frame members $a$, $a'$ of the main frame A of the machine.

Rotation is adapted to be imparted to the worm shaft 16 to turn the auxiliary frame C pivotally in either direction to raise or lower the implement D, as the case may be, by means of worm gears 21 and 22 secured, respectively, to the worm shaft 16 and to a pinion shaft 23 rotatably mounted in suitable bearings at the upper end of the pedestal 19.

As shown, the pinion shaft 23 is adapted to be turned manually by means of a wheel 24 secured thereto. In the preferable construction shown, the operating wheel 24 is secured directly to a tubular member 25 slidably fitted to the pinion shaft 23 and secured thereto by means of a set screw 26, thus providing for adjusting the operative length of the pinion shaft 23 within a considerable range, to meet different operating conditions.

In practice, the machine is adapted to be tractor drawn and to provide for making tractor connections thereto a clevis member 27 is secured to the front end of the main frame A, said member being provided with a plurality of holes 28 arranged to form a vertical series, in which a pin adapted for connecting a clevis 29 to said member 27 is interchangeable, thus providing for making tractor connections to the frame A of tractors, the draw bars of which are positioned at different heights.

In practice, it is contemplated that manipulation of the hand wheel 24 to turn the pinion shaft 23 to effect adjustment of the soil-tilling implement proper D, to raise or lower the same, shall be effected by the tractor operator from his seat on the tractor, and it is to provide for varying the operative length of said pinion shaft to render the same conveniently accessible to such operator to adapt the machine for use with tractors of different makes, that said pinion shaft is rendered longitudinally adjustable, as explained.

In the preferable construction shown, the driving connection of the axle 1 with the shaft $d$ of the soil-tilling implement D comprises a clutch whereby, when desired as, for example, when the machine is traveling along a highway, said driving connection may be thrown out of gear so that said soil-tilling implement proper will be passive or stationary.

As shown, the clutch for driving said soil-tilling implement D comprises a clutch member 30 splined to the axle 1 and a clutch member 31 secured to the hub of the spocket wheel 8, said movable clutch member 30 being controlled by lever connections comprising a forked lever 32 pivotally mounted at the end of a pedestal 33 secured to the adjacent frame member $a$, pivotally mounted in the formed end of which are segmental rings 34 which engage a slot 35 formed in the hub of the splined clutch section 30.

The free end of the lever 32 is connected by a link 36 with one end of a lever 37 pivoted to a fixed bar 38 on the machine frame. Pivotal movement is adapted to be imparted to the lever 37 to throw the clutch member 30 in and out of gear by means of a hand lever 39 pivoted to a fixed part of the machine, a projection on which engages a slot 40 formed in the free end of said lever 37.

While I have herein shown and described what I now consider to be a preferable form of my invention, it is obvious that, within the scope and contemplation of the invention, such embodiment admits of a wide range of variation and modification. I do not, therefore, desire to limit the protection of the patent to the specific structure shown, but to include therein such variations and modifications as come within the scope of the claims.

I claim:
1. In an agricultural implement for the purpose specified, the combination of a mobile vehicle consisting of a supporting frame, a single axle rotatably mounted in bearings formed therein between the ends thereof, supporting wheels on said axle including a traction wheel, means rendered operative by advancing movement of the vehicle for causing the axle to rotate with said traction wheel, a rigid auxiliary frame, means for pivotally mounting said auxiliary frame upon the main frame with its rear end overhanging the rear end of said main frame and its front end extending to within a short distance of the front end of said main frame, a soil tilling implement rotatably mounted on the overhanging rear end of the auxiliary frame, the pivot of the auxiliary frame being arranged at the rear end of the main frame and a sufficient distance above the same to provide for pivotal movement of said auxiliary frame corresponding to maximum contemplated raising and lowering movement of the soil tilling implement in operation and the application of substantially maximum leverage for so turning said auxiliary frame, means for making close-coupled tractor connections to the front end of the main frame, and self-locking means comprising a manually operable member accessible for operation by the driver of a tractor coupled to the vehicle for turning the auxiliary frame pivotally to raise and lower said soil tilling implement in operation, and driving connection between the axle of the vehicle and the shaft of the soil tilling implement for rotating said implement.

2. An agricultural implement as specified in claim 1, in which the means for turning the auxiliary frame pivotally consists of a worm gear secured to the front end of said auxiliary frame, a worm shaft, a worm secured thereto which meshes with said segmental worm gear, and manually operable means for turning said worm shaft, accessible for operation by the driver of the tractor.

3. An agricultural implement as specified in claim 1, in which the means for pivotally mounting the auxiliary frame of the implement consists of a transverse shaft mounted to rotate freely in bearings formed in pedestals secured to the rear end of the main frame of the vehicle and also in bearings in said auxiliary frame, the shaft of the soil-tilling implement and the pivot shaft of the auxiliary frame being connected in train with the axle of the vehicle by suitable driving means.

4. An agricultural implement as specified in claim 1, in which the auxiliary frame in which the soil-tilling implement is mounted consists of spaced side members, a transverse frame member secured to and which rigidly connects the rear ends of said side members, a transverse shaft rotatable in bearings in said side members and which forms the pivot of said auxiliary frame, and brackets secured to and which depend from the transverse member secured to the rear ends of the side members of said auxiliary frame, said depending brackets being provided with sets of bearings to which, respectively, the pivot shaft of said auxiliary frame and the shaft of the soil-tilling implement are fitted to turn, respectively.

In witness that I claim the foregoing as my invention, I affix my signature this 7th day of April, 1930.

SAMUEL DINSMORE.